United States Patent
Lindsay et al.

(10) Patent No.: US 11,117,493 B1
(45) Date of Patent: Sep. 14, 2021

(54) VEHICLE SEAT RAISING APPARATUS AND CORRESPONDING METHOD

(71) Applicants: Stephen Charles Lindsay, Las Vegas, NV (US); Joseph Alonzo Lund, St. George, UT (US)

(72) Inventors: Stephen Charles Lindsay, Las Vegas, NV (US); Joseph Alonzo Lund, St. George, UT (US)

( * ) Notice: Subject to any disclaimer, the term of this patent is extended or adjusted under 35 U.S.C. 154(b) by 0 days.

(21) Appl. No.: 16/805,388

(22) Filed: Feb. 28, 2020

(51) Int. Cl.
*B60N 2/005* (2006.01)

(52) U.S. Cl.
CPC .................. *B60N 2/005* (2013.01)

(58) Field of Classification Search
CPC ......... B60N 2/005; B60N 2/015; B60N 2/682
USPC ........................................................... 296/63
See application file for complete search history.

(56) References Cited

U.S. PATENT DOCUMENTS

| 7,588,281 | B2* | 9/2009 | Tietje | B60N 2/015 |
| | | | | 296/63 |
| 8,235,459 | B2* | 8/2012 | Wendling | B60N 2/015 |
| | | | | 296/193.07 |
| 9,796,297 | B2* | 10/2017 | LaRuffa | B60N 2/30 |
| 2014/0070067 | A1* | 3/2014 | Jonsson | B60N 2/24 |
| | | | | 248/429 |

FOREIGN PATENT DOCUMENTS

| CN | 106143218 A | * | 11/2016 | |
| FR | 2980157 A1 | * | 3/2013 | B60N 2/06 |
| JP | 59160635 A | * | 9/1984 | B60N 2/015 |
| KR | 0116345 Y1 | * | 4/1998 | |
| WO | WO-2014006976 A1 | * | 1/2014 | B60N 2/015 |
| WO | WO-2017072432 A1 | * | 5/2017 | B60N 2/015 |

OTHER PUBLICATIONS

Amazon, "Ohio Diesel Parts Adjustable Front Seat Spacer Lift Kit", https://www.amazon.com/Ohio-Diesel-Parts-Adjustable-Driver/dp/B01MU0GWIH/ref=sr_1_1?dchild=1&keywords=ram+truck+seat+spacer&qid=1591721553&sr=8-1, accessed Jun. 16, 2020, 7 pages.
Amazon, "Ohio Diesel Parts Jeep Wrangler JK & JKU Front Seat Spacer Blocks Lift and Recline Kit", https://www.amazon.com/Wrangler-espaciadores-Reclina-delantero-2007-2017/dp/B071VB9J9V/ref=sr_1_1?dchild=1&keywords=jeep+front+seat+spacer&qid=1591721593&sr=8-1, accessed Jun. 16, 2020, 7 pages.
Amazon, "Supreme Suspensions Seat Risers for Jeep Wrangler 2 Inch Seat Risers CNC Machined T6 Aircraft Billet", https://www.amazon.com/Supreme-Suspensions-Wrangler-Machined-Aircraft/dp/B00K1PG4E0/ref=sr_1_35?dchild=1&keywords=jeep+front+seat+spacer&qid=1591721593&sr=8-35, accessed Jun. 16, 2020, 8 pages.

\* cited by examiner

*Primary Examiner* — Jason S Morrow
*Assistant Examiner* — Kevin P Weldon
(74) *Attorney, Agent, or Firm* — Weide & Miller, Ltd.

(57) ABSTRACT

A seat raising mechanism and corresponding method allow raising a seat of a vehicle. The seat raising mechanism is configured to be inserted between a seat frame and a floor of a vehicle, and has a shape configured to match a shape of the seat frame, with an upper and lower surface having a substantially flat upper portion and an angled portion angled downward from the upper portion. A pin receiving hole is included in the upper surface of the seat raising mechanism to receive a pin of the seat frame and a threaded bolt attaches the seat raising mechanism to the floor.

20 Claims, 4 Drawing Sheets

VEHICLE SEAT RAISING APPARATUS AND CORRESPONDING METHOD

FIELD OF THE INVENTION

The present invention relates to a seat raising apparatus and corresponding method. In particular, the present invention relates to a seat raising apparatus and corresponding method for a vehicle.

BACKGROUND OF THE INVENTION

Some vehicles have front seats that are not adjustable in height, such as the second and third generation Toyota Tacoma (2005-2020), 2003-2020 Toyota 4Runners, and 2006-2014 Toyota FJ Cruisers with factory seats. Many owners have complained that the front seats are installed too low, resulting in uncomfortable seating and driving positions. The front seats are mounted to the floor at four mounting points, two of the mounting points at a back of the front seat, and two of the mounting points at a front of the front seat. It is relatively easy to raise the back mounting points because the back mounting points are attached to a flat part of the floor. Several solutions for raising the back mounting points have been available, some of which use simple washers placed on the mounting bolts between the floor and the seat frame.

However, the inventors of this application has determined that only raising the back of the seats at the two back mounting points does not alleviate the above-described problems and that raising the front of the front seats in these vehicles is desirable to improve the comfort level of the seating and driving position. This problem has been reported to cause a lack of leg support and lower back stress.

Accordingly, an apparatus for remedying the above problems is desired.

SUMMARY OF THE INVENTION

Embodiments of the invention provide a seat raising apparatus and a corresponding method configured to raise a seat height of a vehicle from a vehicle floor in a front portion of the seat. The seat raising apparatus is configured to raise a height of a seat of a vehicle by inserting the seat raising apparatus between a first attachment portion of a floor of the vehicle and a second attachment portion of a seat frame of the seat, the first attachment portion of the floor of the vehicle being raised from the floor of the vehicle and having a substantially flat first upper portion and a first angled portion angled downward from the first upper portion, the second attachment portion of the seat frame including a substantially flat second upper portion, a second angled portion angled downward from the second upward portion, and a pin extending downward from the substantially flat second upper portion.

The seat raising apparatus includes a seat raising mechanism having a third attachment portion having an upper surface and fourth attachment portion having a lower surface, the upper surface including a third substantially flat portion and a third angled portion angled downward from the third substantially flat portion, the lower surface including a fourth substantially flat portion and a fourth angled portion angled downward from the fourth substantially flat portion, the seat raising mechanism having a front face extending between the upper surface and the lower surface, a pin receiving hole in the third flat portion of the upper surface of the seat raising mechanism, a threaded hole on the third angled portion of the upper surface of the seat raising mechanism, the threaded hole configured to receive a first connector to connect the seat frame to the seat raising mechanism, and a recessed portion formed in the upper surface and in the front surface of the seat raising mechanism, the recessed portion having a back wall extending downward from the upper surface and a seat at a bottom of the back wall, the seat having a hole formed therein extending from the seat to the lower surface of the seat raising mechanism, the hole configured to receive a second connector to connect the seat raising mechanism to the floor of the vehicle.

The seat raising mechanism is configured to raise a seat of the vehicle by the seat raising mechanism being inserted between the first attachment portion of the floor of the vehicle and the second attachment portion of the seat frame such that a seat frame pin extending downward from the substantially flat second upper portion of the seat frame is received in the pin receiving hole of the third flat portion of the upper surface of the seat raising mechanism.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise a seat height raising mechanism configured to raise a seat height of a front portion of a seat in a vehicle. The invention is particularly useful in vehicles having seats that are not height adjustable.

A seat raising mechanism 100 is illustrated in FIGS. 1-4. The seat raising mechanism 100 is configured to allow a user to raise a front portion of a front seat in a vehicle. The seat raising mechanism 100 is configured to be insertable between a floor of the vehicle and the seat frame. The seat raising mechanism 100 is configured to be easily installed by a user, and to secure the seat to the floor, as further explained herein.

Figure 1:
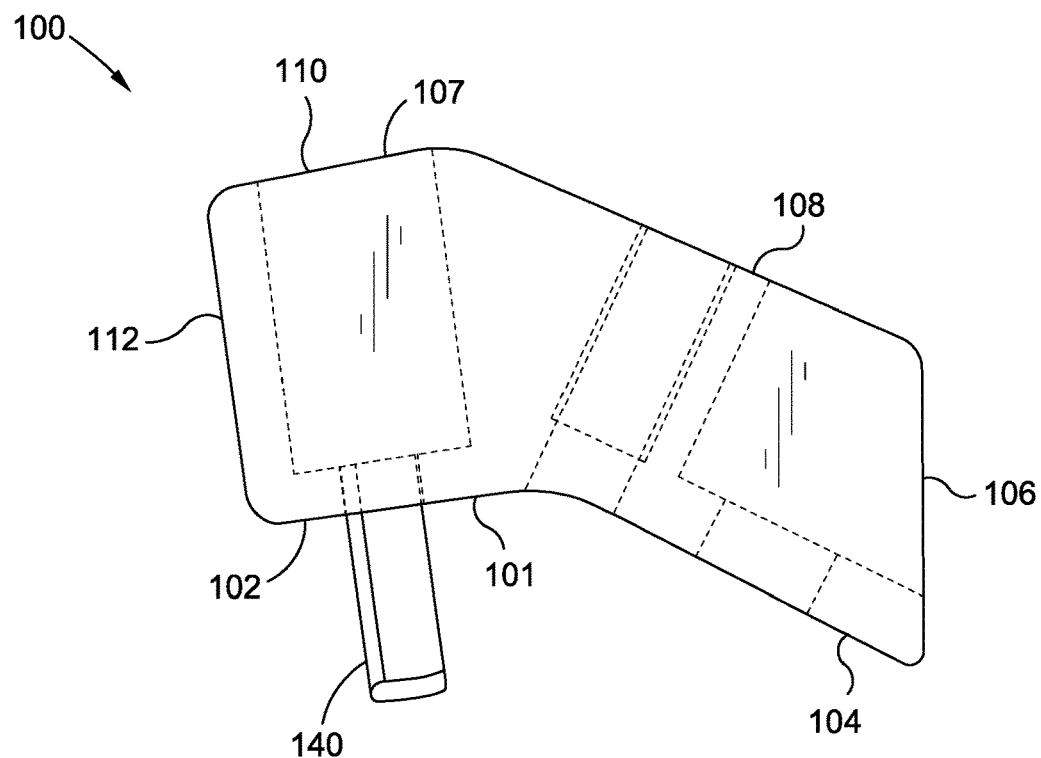
FIG. 1 illustrates a side view of a seat raising mechanism in accordance with embodiments of the invention.

FIG. 1 illustrates a side view of the seat raising mechanism 100. The seat raising mechanism is shaped to conform with the floor of the vehicle in a position where the seat frame attaches to the floor of the vehicle. The seat raising mechanism includes a lower surface 101 having a first portion 102 that is substantially flat and a second portion 104 that is angled with respect to the first portion 102. A pin 140 extends downward from the first portion 102. The pin 140 is configured to be inserted into a pin receiving hole (not shown) in the floor of the vehicle.

The seat raising mechanism 100 further includes a front surface 106, a back surface 112 and an upper surface 107 having a first portion 110 that is substantially flat and a second portion 108 that is angled with respect to the first portion 110. The lower surface 101 of the seat raising mechanism 100 is shaped to conform with the shape of the floor of the vehicle, and the upper surface 107 of the seat raising mechanism 100 is shaped to conform with the shape of the frame of the seat, such that the seat raising mechanism 100 can be placed between the floor of the vehicle and the seat frame as further shown and described herein.

Figure 2:
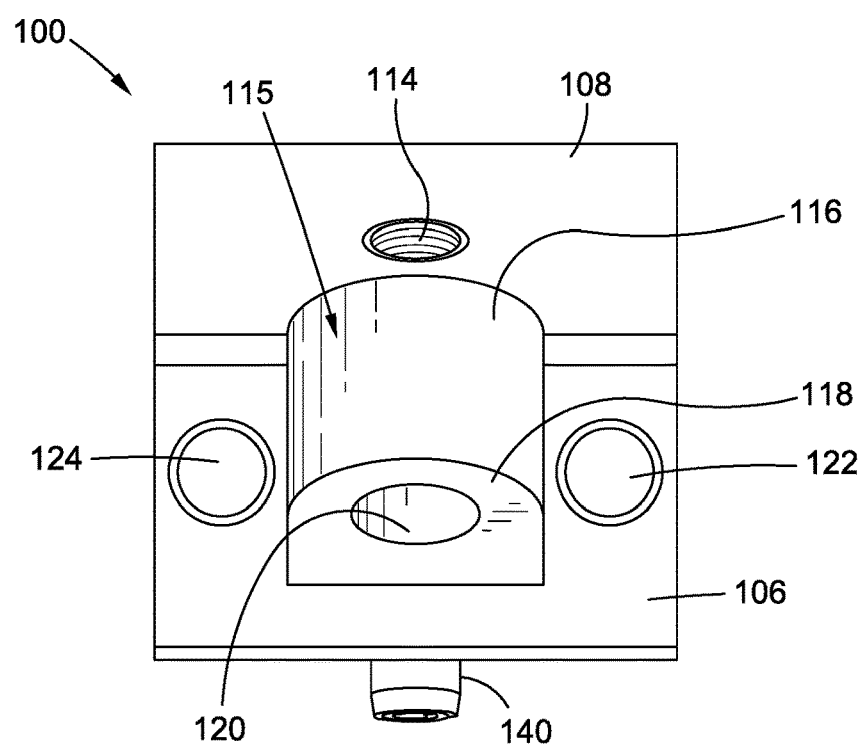
FIG. 2 illustrates a front perspective view of a seat raising mechanism in accordance with embodiments of the invention.

FIG. 2 illustrates a front view of the seat raising mechanism 100. On the second portion 108 of the upper surface 107, a first hole 114 is disposed. The first hole 114 may be threaded. In some embodiments, attachment holes 122, 124 may be disposed on the front surface 106.

The seat raising mechanism 100 further includes a recessed portion 115 which is recessed from the second portion 108 of the upper surface 107 and from the front surface 106. The recessed portion 115 may include a curved back wall 116 extending in a direction substantially perpendicular to the first portion 110 of the upper surface 107 and a seat 118 having a substantially flat shape with a second hole 120 disposed therein. The second hole 120 may extend through to the second portion 104 of the bottom surface 101.

Figure 3:
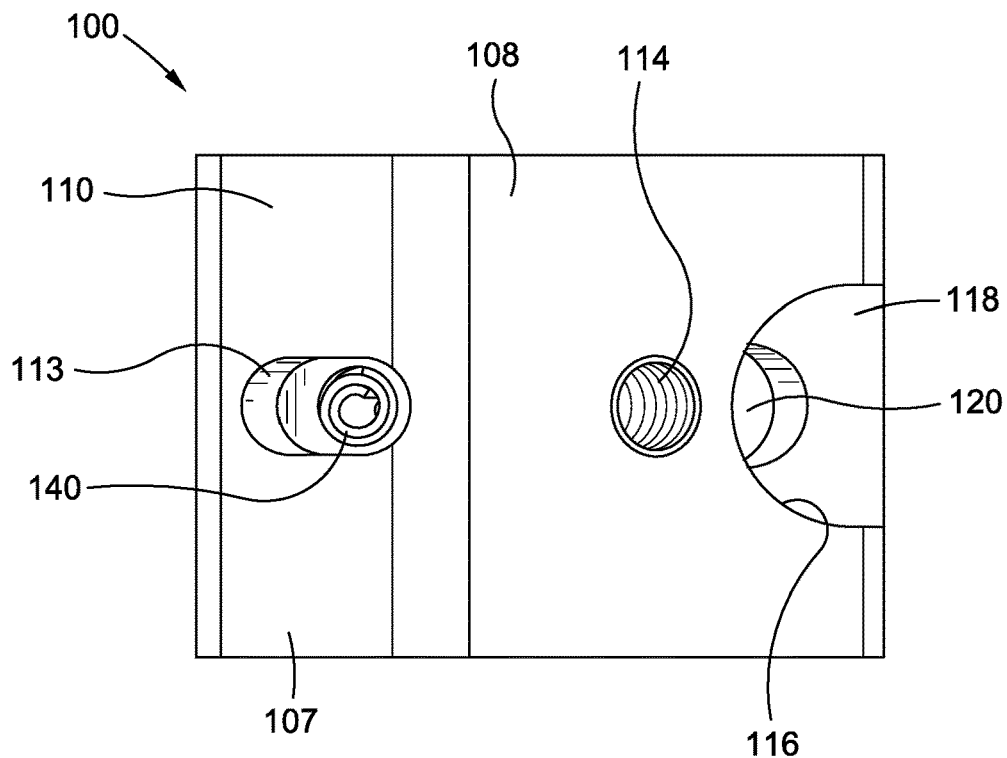
FIG. 3 illustrates a top view of a seat raising mechanism in accordance with embodiments of the present invention.

FIG. 3 illustrates a top view of the seat raising mechanism 100. A third hole 113 may be disposed in the first portion 110 of the upper surface 107. The third hole 113 is configured to receive a pin from a seat frame, as further explained herein. The third hole 113 may have a substantially round shape, or a more oval or oblong shape. A pin 140 extends downward from the bottom surface 101 and may be aligned with the third hole 113. In FIG. 3, the top of the pin 140 is visible through the third hole 113. In some embodiments, the pin 140 may be rolled steel, or may be a solid pin. The pin 140 may be press fitted into a smaller hole from the bottom surface 101 of the seat raising mechanism 100. Alternatively, the pin 140 could be integrated into the seat raising mechanism 100 in any feasible manner.

Figure 4:
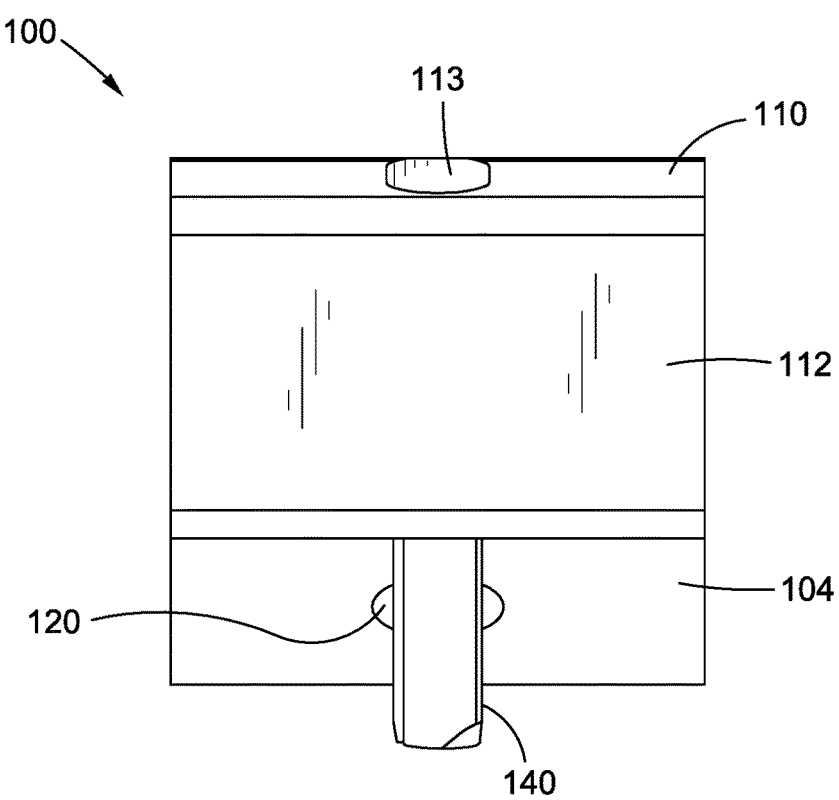
FIG. 4 illustrates a rear view of a seat raising mechanism in accordance with embodiments of the present invention.

FIG. 4 illustrates the back surface 112 of the seat raising mechanism 100. The pin 140 can be seen extending down from the first portion 102 of the lower surface 101. A portion of the second hole 120 is visible in FIG. 4.

The seat raising mechanism 100 may be formed of various materials. In a preferred embodiment, the seat raising mechanism 100 is formed of Aluminum, such as 7075 Aluminum. The seat raising mechanism 100 may be configured to raise a seat of the vehicle by approximately 1¼ inches, although other height raising amounts could be used. The inventors have determined that 1¼ inches is a seat raising amount that provides improved comfort to many users of certain vehicles, such as the Toyota vehicles mentioned herein.

For example, the distance between the first portion 102 of the lower surface 101 and the first portion 110 of the upper surface 107 may be 1¼ inches, and the distance between the second portion 104 of the lower surface 101 and the second portion 108 of the upper surface 107 may be 1¼ inches. The seat raising mechanism 100 may include a protective coating such as a powder coating.

Figure 5:
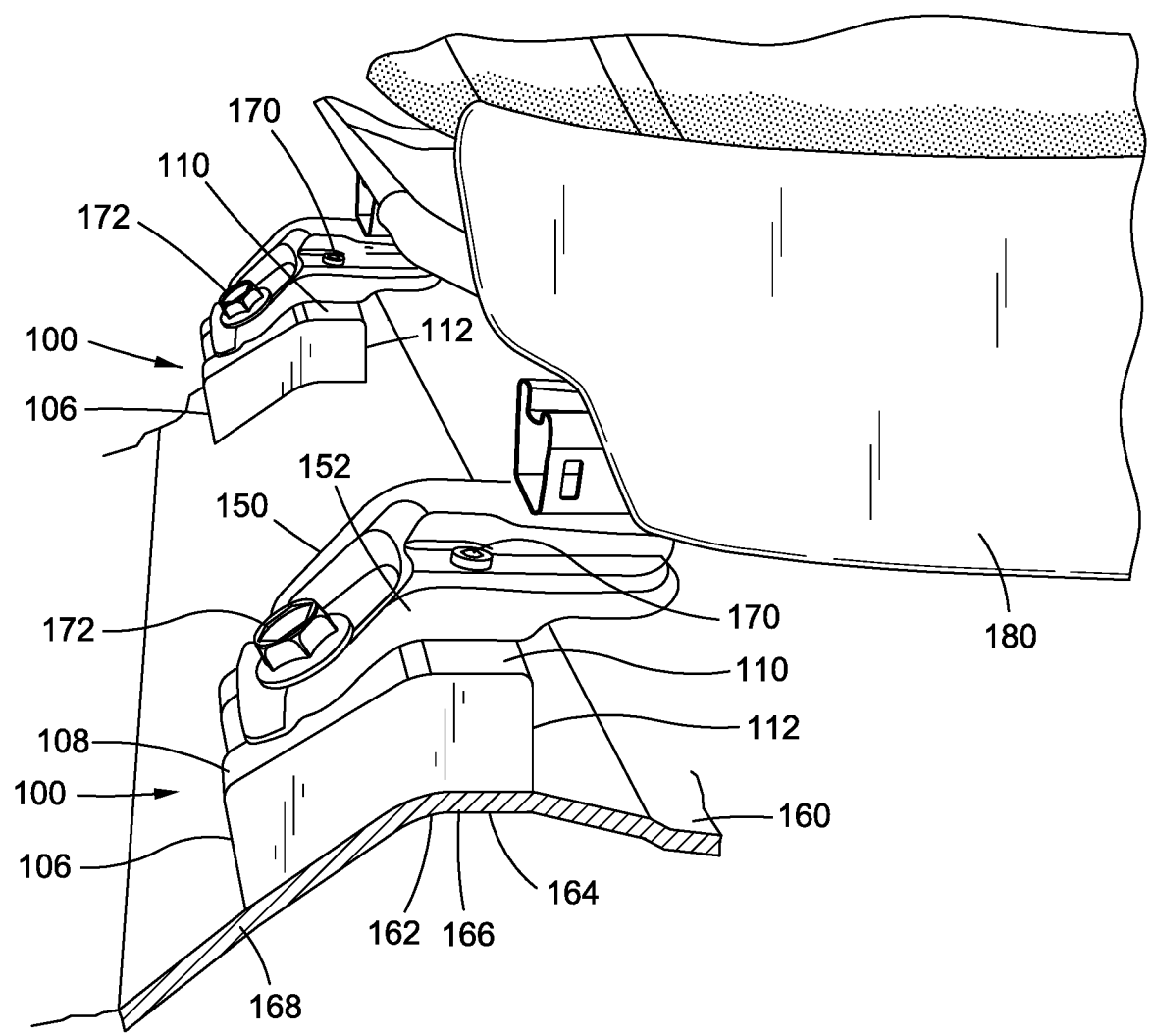
FIG. 5 illustrates a perspective view of two seat raising mechanisms installed in a vehicle raising a seat height of a front of the seat in accordance with embodiments of the present invention.

FIG. 5 is a perspective view of two of the seat raising mechanisms 100 attached between a seat frame 150 and a floor 160 of a vehicle to raise a front portion of the seat 180. The floor 160 has a floor attachment portion 162 configured to facilitate attaching the seat frame 150 to the floor 160 (when the seat raising mechanism 100 is not used). The floor attachment portion 162 has a raised portion 164 that is raised from a bottom surface of the floor 160. The raised portion 164 includes an upper flat portion 166 and a downwardly sloped front portion 168. Likewise, the seat frame 150 includes a seat frame attachment portion 152 that is configured to facilitate connection of the seat frame 150 to the floor 160. In a particular implementation used in the Toyota Tacoma and other Toyota vehicles as discussed herein, a pin 170 integrated into the seat frame 150 is inserted into a hole (not shown) in the upper flat portion 166 of the floor 160. Additionally, a threaded bolt 172 is used to connect the seat frame 150 to a threaded hole in the downwardly sloped front portion 168 of the floor 160. Other connection points for the pin and threaded bolt could be used in other vehicles.

Figure 6:
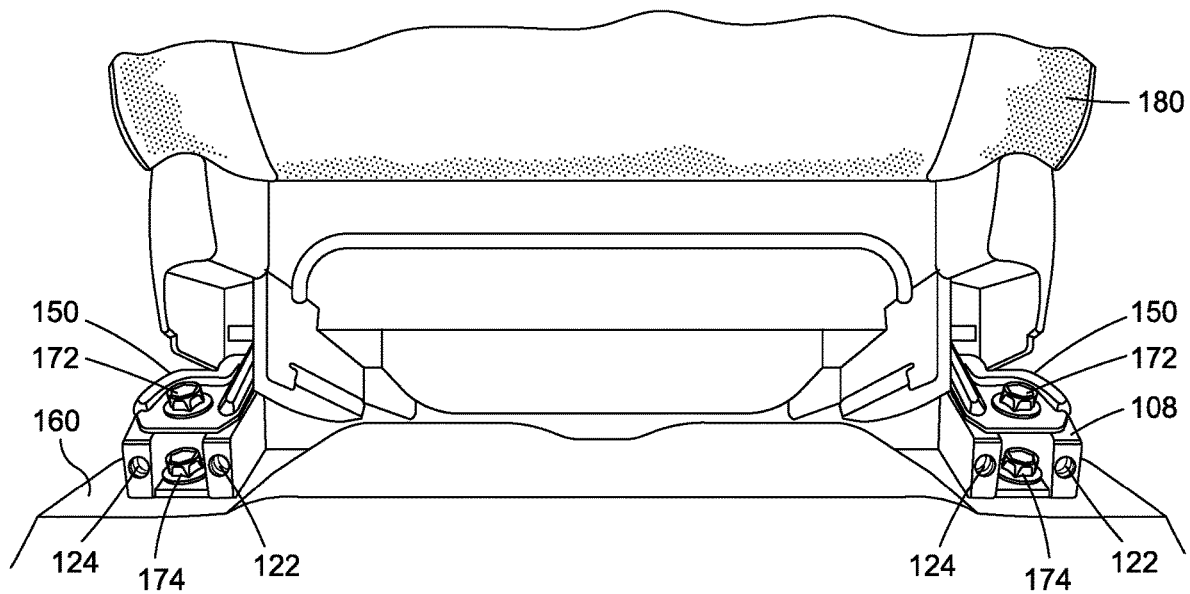
FIG. 6 illustrates the in accordance with embodiments of the present invention.

FIG. 6 illustrates a front view of the seat 180 with two of the seat raising mechanisms 100 installed. A connector 174 connects the seat raising mechanisms 100 to the floor 160 of the vehicle. The connector 174 may be a threaded bolt, although other types of connectors could be used.

To raise the seat 180 using the seat raising mechanisms 100, a user first removes the threaded bolts 172 such as by use of a socket at both sides of the front of the seat 180. It may be necessary to loosen bolts (not shown) connecting the back of the seat 180 to allow for improved alignment of the seat raising mechanisms 100 between the floor 160 and the attachment portions 152 of the seat frame 150. The front of the seat 180 is then lifted, such as by pushing on a portion of the seat 180 (such as the seat back or seat headrest). The seat is then temporarily held in the lifted position and the pin 140 of the seat raising mechanisms 100 is inserted into the hole of the vehicle (that was previously used by pin 170 of the seat frame 150).

Then, the connectors 174, which may be M10 threaded bolts, are inserted into the second hole 120 of the recessed portion 115 of the seat raising mechanisms 100 and into a threaded hole in the floor 160 of the vehicle. The connectors 174 may be the bolts supplied by the vehicle manufacturer that were used to connect the seat frame 150 to the floor 160 of the vehicle or may be separately provided with each of the seat raising mechanism 100.

Next, the seat 180 of the vehicle is lowered so that the seat frame attachment portion 152 of the seat frame 150 is lowered onto the top surface 107 of the seat raising mechanisms 100. The pin 170 extending downward from the bottom of the seat frame 150 is inserted into the third hole 113 in the first portion 110 of the upper surface 107 of each seat raising mechanism 100.

Next, the bolt 172 is inserted through the hole in the seat frame 150 and into the first hole 114 on the second portion 108 of the upper surface 107 of the seat raising mechanisms 100. The bolt 172 tightened finger tight. The bolts 172 and 174 are then tightened to a torque amount, such as 27 ft.-lbs., such as by using a torque wrench or other means.

Figure 7:
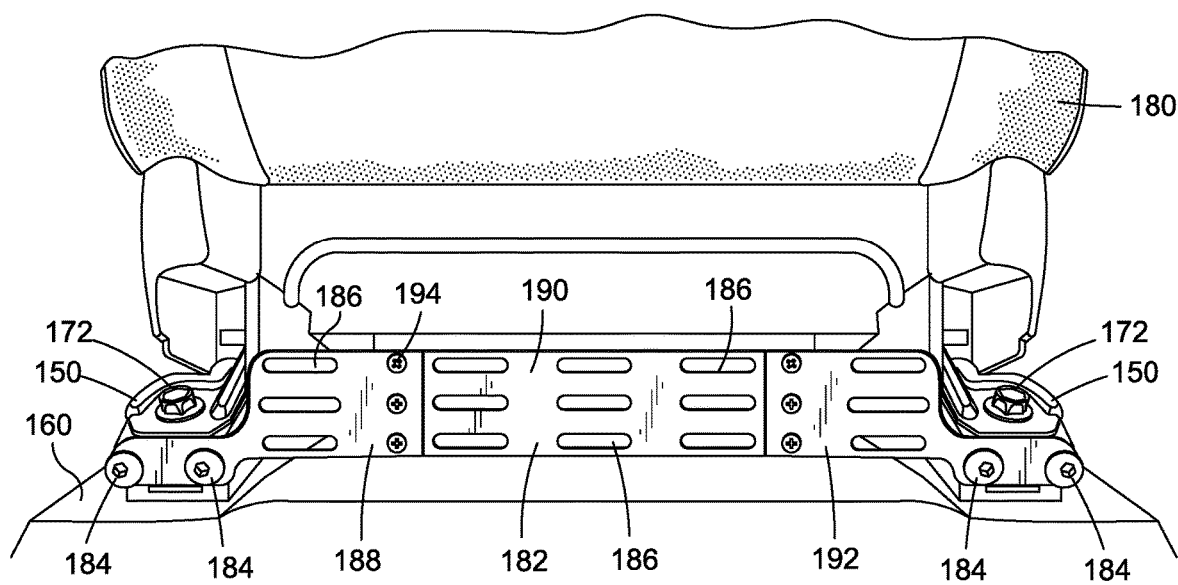
FIG. 7 illustrates the in accordance with embodiments of the present invention.

FIG. 7 illustrates an alternative embodiment in which a multi-mount panel 182 is attached to two of the seat raising mechanisms 100 that have been installed to raise a seat 180 of a vehicle. The multi-mount panel 182 is attached to the attachment holes 122, 124 on the front surface 106 of the seat raising mechanisms 100 using connectors 184. The connectors 184 may be any type of connector, although in a preferred embodiment, the connectors may be threaded connectors with a thread to fit into threaded attachment holes 122, 124 and having a Ball-End Allen head, such as a 6 mm Ball-End Allen.

The multi-mount panel 182 has a plurality of mounting points 186, which in one embodiment may be oval-shaped slots, although other configurations of mounting points on the multi-mount panel 182 may be used. The mounting points 186 may include different shapes and sizes of connection points to fit various types of mounting hardware. For example, the mounting points 186 may be sized to fit various MagLite mounts, such as AA, C and D size MagLite mounts, to fit Quick Fist or other rubber clamps, to fit fire extinguisher mounts, to fit gun holsters, and to fit any other items to mount to the multi-panel mount 182. In this manner, a user can easily mount items such as a flashlight, a fire extinguisher, a gun, an ax, etc. to the multi-panel mount 182. Additionally, because of the design of the multi-panel mount, items can be mounted to the front or rear thereof. Nylon straps with Velcro or hook and loop may also be used to secure items to the multi-mount panel 182.

The multi-mount panel 182 may be made from a hard metal such as aluminum or steel, although other materials could be used. Any number and size of the mounting points 186 could be used. Additionally, the multi-mount panel 182 may be formed from one piece of metal or be made from several pieces that are attached together to form multi-mount panel 182. For example, multi-mount panel 182 may comprise three individual portions 188, 190 and 192 that are attached together with hardware or by other means. In one embodiment, the portions 188, 190 and 192 are attached together using hardware, such as screws 194.

While this embodiment shows connection of the multi-panel mount 182 to two attachment holes 122, 124, one or more attachment points or holes could be used to attach the multi-mount panel 182 to each seat raising mechanism, or to only one of the seat-raising mechanisms 100. Furthermore, the attachment points or holes 122, 124 do not have to be on the front surface 106 of the seat raising mechanism 100 but could be on any surface.

While the multi-panel mount 182 is shown in the figures as being connected to the seat raising mechanism 100, the multi-panel mount 182 could also be connected directly to the frame of the seat. For example, a bracket could be used to connect the multi-panel mount 182 at the point that the bolt is inserted into the hole in the seat frame attachment portion 152.

It will be appreciated that the seat raising mechanism 100 illustrated in the figures is only exemplary of the specific illustrated embodiments and that various modifications could be made. For example, embodiments of the seat raising mechanism may be provided either with or without the multi-panel mount 182, and with or without the attachment holes 122, 124 used to attach the multi-panel mount.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A seat raising apparatus configured to raise a height of a seat of a vehicle by inserting the seat raising apparatus between a first attachment portion of a floor of the vehicle and a second attachment portion of a seat frame of the seat, the first attachment portion of the floor of the vehicle being raised from the floor of the vehicle and having a substantially flat first upper portion and a first angled portion angled downward from the first upper portion, the second attachment portion of the seat frame including a substantially flat second upper portion, a second angled portion angled downward from the second upward portion, and a pin extending downward from the substantially flat second upper portion, the seat raising apparatus comprising:

a seat raising mechanism having a third attachment portion having an upper surface and fourth attachment portion having a lower surface, the upper surface including a third substantially flat portion and a third angled portion angled downward from the third substantially flat portion, the lower surface including a fourth substantially flat portion and a fourth angled portion angled downward from the fourth substantially flat portion, the seat raising mechanism having a front face extending between the upper surface and the lower surface;

a pin receiving hole in the third flat portion of the upper surface of the seat raising mechanism;

a threaded hole on the third angled portion of the upper surface of the seat raising mechanism, the threaded hole configured to receive a first connector to connect the seat frame to the seat raising mechanism; and a recessed portion formed in the upper surface and in the front surface of the seat raising mechanism, the recessed portion having a back wall extending downward from the upper surface and a seat at a bottom of the back wall, the seat having a hole formed therein extending from the seat to the lower surface of the seat raising mechanism, the hole configured to receive a second connector to connect the seat raising mechanism to the floor of the vehicle, wherein the seat raising mechanism is configured to raise a seat of the vehicle by the seat raising mechanism being inserted between the first attachment portion of the floor of the vehicle and the second attachment portion of the seat frame such that a seat frame pin extending downward from the substantially flat second upper portion of the seat frame is received in the pin receiving hole of the third flat portion of the upper surface of the seat raising mechanism.

2. The seat raising mechanism according to claim 1, wherein the back wall of the recessed portion is a curved wall.

3. The seat raising mechanism according to claim 1, wherein the back wall of the recessed portion extends substantially perpendicular to the third angled portion of the upper surface of the seat raising mechanism.

4. The seat raising mechanism according to claim 1, wherein the back wall of the recessed portion extends substantially perpendicular to the fourth angled portion of the lower surface of the seat raising mechanism.

5. The seat raising mechanism according to claim 1, further comprising a pin extending downward from the fourth substantially flat portion of the lower surface of the seat raising mechanism.

6. A seat raising mechanism according to claim 5, wherein the pin is positioned to fit within a hole in the floor of the vehicle when the seat raising mechanism is positioned between the first attachment portion of the floor of the vehicle and the second attachment portion of the vehicle seat frame.

7. A seat raising mechanism according to claim 1, further comprising at least one threaded hole formed in the front surface of the seat raising mechanism.

8. A kit for raising a seat of a vehicle, comprising two of the seat raising mechanisms of claim 1.

9. The kit according to claim 8, further comprising two threaded connecting bolts, each of the threaded connecting bolts configured to be inserted through a hole in the seat frame and to be threaded into a threaded hole on the third angled portion of the upper surface of one of the seat raising mechanisms to connect the seat frame to a corresponding seat raising mechanism for each of the two seat raising mechanisms.

10. The kit according to claim 8, wherein the seat raising mechanisms each further comprise at least one threaded hole formed in the front surface of each of the seat raising mechanisms, the kit further comprising a multi-mount panel, the multi-mount panel having connecting holes allowing connection of the multi-mount panel to the seat raising mechanisms.

11. The kit according to claim 10, wherein the multi-mount panel includes a plurality of mounting points for mounting accessories.

12. The kit according to claim 11, wherein the mounting points comprise a plurality of slots configured to receive accessory mounting hardware for mounting accessories to the multi-mount panel.

13. A method of raising a front portion of a seat of a vehicle, the vehicle having a floor with first attachment portions connected to a pair of second attachment portions of a seat frame of the seat, the first attachment portions of the floor being raised from an adjacent portion of the floor of the vehicle and having a substantially flat first upper portion with a pair of pin receiving holes formed therein, a first angled portion angled downward from the first upper portion, the first angled portion having a pair of threaded bolt holes formed therein, the second attachment portions of the seat frame each having a substantially flat second upper portion, a second angled portion angled downward from the second upper portion, a bolt hole formed in the second angled portions of each of the second attachment portions, and a seat frame pin extending downward from the substantially flat second upper portion, the seat frame pins being inserted into corresponding ones of the pin receiving holes in the floor, and a pair of threaded connecting bolts disposed through the bolt holes and threaded into each of the threaded bolt holes to connect the seat frame to the floor, comprising:

removing the threaded connecting bolts from the threaded bolt holes in the floor and from the bolt holes in the seat frame;

lifting the seat and inserting one seat raising mechanism between each of the second attachment portions of the seat frame and the first attachment portions of the floor, each seat raising mechanism comprising a third attachment portion having an upper surface and fourth attachment portion having a lower surface, the upper surface including a third substantially flat portion and a third angled portion angled downward from the third substantially flat portion, the lower surface including a fourth substantially flat portion and a fourth angled portion angled downward from the fourth substantially flat portion, each seat raising mechanism further comprising a front face extending between the upper surface and the lower surface, a pin receiving hole in the third flat portion of the upper surface of the seat raising mechanism, and a recessed portion formed in the upper surface and in the front surface of the seat raising mechanism, the recessed portion having a back wall extending downward from the upper surface and a flat base at a bottom of the back wall, the flat base having a hole formed therein extending from the flat base to the lower surface of the seat raising mechanism, by inserting a seat frame pin extending downward from the substantially flat second upper portion into the corresponding pin receiving holes in the third flat portion of the upper surface of each of the seat raising mechanisms; and inserting and tightening a threaded connector through the hole in the seat frame, further through the hole in the flat base at the bottom of the back wall of each of the seat raising mechanisms and into the corresponding threaded holes in the floor of the vehicle.

14. The method according to claim 13, wherein the back wall of the recessed portion is a curved wall.

15. The method according to claim 13, wherein the back wall of the recessed portion extends substantially perpendicular to the third angled portion of the upper surface of the seat raising mechanism.

16. The method according to claim 13, wherein at least one threaded hole is formed in the front surface of the seat raising mechanism.

17. The method according to claim 16, further comprising attaching a multi-mount panel to the at least one threaded hole of the seat raising mechanisms so that the multi-mount panel extends between the seat raising mechanisms.

18. The method according to claim 17, wherein the multi-mount panel includes a plurality of mounting points for mounting accessories.

19. The method according to claim 18, wherein the mounting points comprise a plurality of slots configured to receive accessory mounting hardware for mounting accessories to the multi-mount panel.

20. The method according to claim 19, mounting at least one accessory to the multi-mount panel.

* * * * *